US012804406B2

(12) United States Patent
Iwamoto et al.

(10) Patent No.: US 12,804,406 B2
(45) Date of Patent: Nov. 17, 2026

(54) CONTROL APPARATUS, CONTROL METHOD, AND PROGRAM

(71) Applicant: NTT, Inc., Tokyo (JP)

(72) Inventors: Masayoshi Iwamoto, Tokyo (JP); Masahiro Kobayashi, Tokyo (JP); Shigeaki Harada, Tokyo (JP)

(73) Assignee: NTT, Inc., Tokyo (JP)

( * ) Notice: Subject to any disclaimer, the term of this patent is extended or adjusted under 35 U.S.C. 154(b) by 280 days.

(21) Appl. No.: 18/698,546

(22) PCT Filed: Nov. 22, 2021

(86) PCT No.: PCT/JP2021/042803
§ 371 (c)(1),
(2) Date: Apr. 4, 2024

(87) PCT Pub. No.: WO2023/089830
PCT Pub. Date: May 25, 2023

(65) Prior Publication Data
US 2024/0406739 A1 Dec. 5, 2024

(51) Int. Cl.
*H04W 16/08* (2009.01)
*H04W 28/02* (2009.01)
*H04W 52/02* (2009.01)

(52) U.S. Cl.
CPC ....... *H04W 16/08* (2013.01); *H04W 28/0289* (2013.01); *H04W 52/0203* (2013.01)

(58) Field of Classification Search
None
See application file for complete search history.

(56) References Cited

U.S. PATENT DOCUMENTS

2006/0128371 A1* 6/2006 Dillon .................. H04W 24/00 455/423
2012/0289269 A1 11/2012 Kumagai
(Continued)

FOREIGN PATENT DOCUMENTS

CN 113411869 A * 9/2019
CN 113411869 9/2021
(Continued)

OTHER PUBLICATIONS

DAS. "Power Saving with Capacity Augmentation for Sustained QoS in 5G Cloud RAN", 2019 IEEE International Conference on Electronics, Computing and Communication Technologies (CONECCT), IEEE, Jul. 26, 2019 (Jul. 26, 2019), pp. 1-5, XP033727315, DOI: 10.1109/CONECCT47791.2019.9012924) (Year: 2019).*

(Continued)

*Primary Examiner* — Andre Tacdiran
(74) *Attorney, Agent, or Firm* — IPUSA, PLLC

(57) ABSTRACT

A control apparatus that controls a base station in a mobile communication system including multiple base stations includes a suspension station determination unit configured to determine, based on a traffic demand of each of the base stations, a suspension station that suspends at least one frequency band and a parameter of at least one repair station that covers a coverage hole generated by the suspension of the suspension station; and a control transmission unit configured to transmit control information, the control information including information on the suspension station determined by the suspension station determination unit and the parameter.

7 Claims, 6 Drawing Sheets

(56) References Cited

U.S. PATENT DOCUMENTS

| | | | | |
|---|---|---|---|---|
| 2012/0320766 | A1* | 12/2012 | Sridhar ................. | H04W 24/02 370/252 |
| 2014/0219150 | A1* | 8/2014 | Lee ................... | H04W 52/0206 370/311 |
| 2015/0055645 | A1* | 2/2015 | Cui ..................... | H04W 56/001 370/350 |
| 2015/0223084 | A1* | 8/2015 | Lightstone ............ | H04L 5/0048 370/252 |
| 2017/0026889 | A1 | 1/2017 | Tsuda et al. | |
| 2017/0324439 | A1* | 11/2017 | Desai ................ | H04W 72/0453 |

FOREIGN PATENT DOCUMENTS

| | | |
|---|---|---|
| JP | 2012-253621 | 12/2012 |
| JP | 2015-130644 | 7/2015 |
| WO | 2011/081042 | 7/2011 |
| WO | WO2017000557 A1 * | 5/2017 |

OTHER PUBLICATIONS

Das Dibakar et al: "Power Saving with Capacity Augmentation for Sustained QoS in 5G Cloud RAN", 2019 IEEE International Conference on Electronics, Computing and Communication Technologies (CONECCT), IEEE, Jul. 26, 2019 (Jul. 26, 2019), pp. 1-5, XP033727315.

Y. Gao et al., "Energy efficient joint optimization of electric antenna tilt and transmit power in 3GPP LTE-Advanced: A system level result," 2013 IEEE 9th International Colloquium on Signal Processing and its Applications, 2013, pp. 135-139, doi:10.1109/CSPA.2013.6530029.

E. Oh et al., "Energy Savings through Dynamic Base Station Switching in Cellular Wireless Access Networks," 2010 IEEE Global Telecommunications Conference GLOBECOM 2010, 2010, pp. 1-5, doi:10.1109GLOCOM.2010.5683654.

Masayoshi Iwamoto et al., "Tsushindan area No. soki fukkyu No. tameNo. antenna tilting angle seigyo shuho (in Japanese) (Antenna tilting angle control method for early recovery of communication interruption area)," The IEICE Society Conference, B-7-6, Sep. 2020.

N. Dandanov et al., "Dynamic Self-Optimization of the Antenna Tilt for Best Trade-off Between Coverage and Capacity in Mobile Networks," Wirel. Pers. Commun., vol. 92, No. 1, pp. 251-278, 2017.

Luo, X. et al., "An Algorithm for Traffic Flow Prediction Based on Improved SARIMA and GA", KSCE J Civ Eng 22, 2018, pp. 4107-4115.

H. D. Trinh et al., "Mobile Traffic Prediction from Raw Data Using LSTM Networks", 2018 IEEE 29th Annual International Symposium on Personal, Indoor and Mobile Radio Communications (PIMRC), 2018, pp. 1827-1832, doi:10.1109/PIMRC2018.8581000.

* cited by examiner

CONTROL APPARATUS, CONTROL METHOD, AND PROGRAM

TECHNICAL FIELD

The present invention relates to a technique for controlling a wireless base station (hereinafter, referred to as a base station) that provides a wireless communication service to a terminal in a mobile communication system.

BACKGROUND ART

Since traffic demand to the base station greatly fluctuates depending on a time zone/place, the base station generally secures a capacity (calculation resource or the like) for traffic processing in accordance with a peak of the traffic demand.

Therefore, in a time zone/place where the traffic demand is small, capacity is excessively secured with respect to the traffic demand. Since power is consumed according to this capacity, power use efficiency with respect to traffic processing deteriorates.

In order to improve the power use efficiency, it has been studied to reduce the power consumption by suspending one or more base stations in a time zone/place where traffic demand is small and covering the area of a suspended base station with a peripheral base station [1 and 2]. Note that the literature names of the reference literatures indicated by numbers in this specification are listed at the end of the specification.

The base station generally covers an area with multiple frequency bands, and can perform suspension for each frequency band. The communication terminal connected to the suspended base station, however, needs to switch the connection destination to another base station, which may deteriorate the communication quality.

Therefore, it is required to perform base station control such as suspension of a base station and changing of parameters (tilt angle, transmission power, etc.) of peripheral base stations while suppressing deterioration in the communication quality of terminals.

CITATION LIST

Non Patent Literature

Non Patent Literature 1: Y. Gao, Y. Li, H. Yu, X. Wang and S. Gao, "Energy efficient joint optimization of electric antenna tilt and transmit power in 3GPP LTE-Advanced: A system level result," 2013 IEEE 9th International Colloquium on Signal Processing and its Applications, 2013, pp. 135-139, doi:10.1109/CSPA.2013.6530029.

SUMMARY OF INVENTION

Technical Problem

As an existing method for improving power use efficiency, there is a (handover) method of suspending a base station with a small traffic demand and switching a terminal connected to the base station to a nearby base station [1]. This method assumes the presence of a base station that can be handed over to the terminal.

In an area in which the cells of base stations do not overlap or an area in which the density of base stations is low, however, the suspension of a base station is likely to cause a location where no radio waves reach (coverage hole) or the insufficiency of the bandwidth of a base station to make it impossible to perform handover. Therefore, this method cannot be applied to the area as described above.

In addition, as another existing method, there is a method of suppressing the deterioration of the communication quality of terminals near one or more base stations while suspending the base stations, by changing parameters such as the elevation angle (tilt angle) and transmission power of the antenna of a base station ([2], Non Patent Literature 1).

According to this method, after a base station to be suspended is determined by some method, parameters for suppressing the communication quality of a terminal are calculated. Since the communication quality of the terminal greatly depends on the base station to be suspended, however, it may be impossible to secure the communication quality depending on the method of selecting the base station to be suspended.

The present invention has been made in view of the above points, and an object of the present invention is to provide a technique capable of achieving both the suppression of deterioration in communication quality and reduction in the power consumption of a base station.

Solution to Problem

According to the disclosed technology, there is provided a control apparatus that controls a base station in a mobile communication system including multiple base stations, the control apparatus including:

- a suspension station determination unit configured to determine, based on a traffic demand of each of the base stations, a suspension station that suspends at least one frequency band and a parameter of at least one repair station that covers a coverage hole generated by the suspension of the suspension station; and
- a control transmission unit configured to transmit control information, the control information including information on the suspension station determined by the suspension station determination unit and the parameter.

Advantageous Effects of Invention

According to the disclosed technique, it is possible to achieve both the suppression of deterioration in communication quality and reduction in the power consumption of a base station.

DESCRIPTION OF EMBODIMENTS

An embodiment of the present invention (this embodiment) will be described below with reference to the drawings. The embodiment described below is merely an example, and embodiments to which the present invention is applied are not limited to the following embodiment.

Outline of Embodiment

According to this embodiment, a control system that controls base stations obtains parameters (tilt angle, transmission power, etc.) of a base station to be suspended and a base station to be operated to reduce power consumption under the constraint that the communication quality of a terminal is secured according to the traffic demand of each base station, and performs control.

As described in an example to be described below, control using a current traffic demand can be performed, or control using a future traffic demand (for example, for each time zone) can be performed.

(System Configuration Example)

Figure 1:
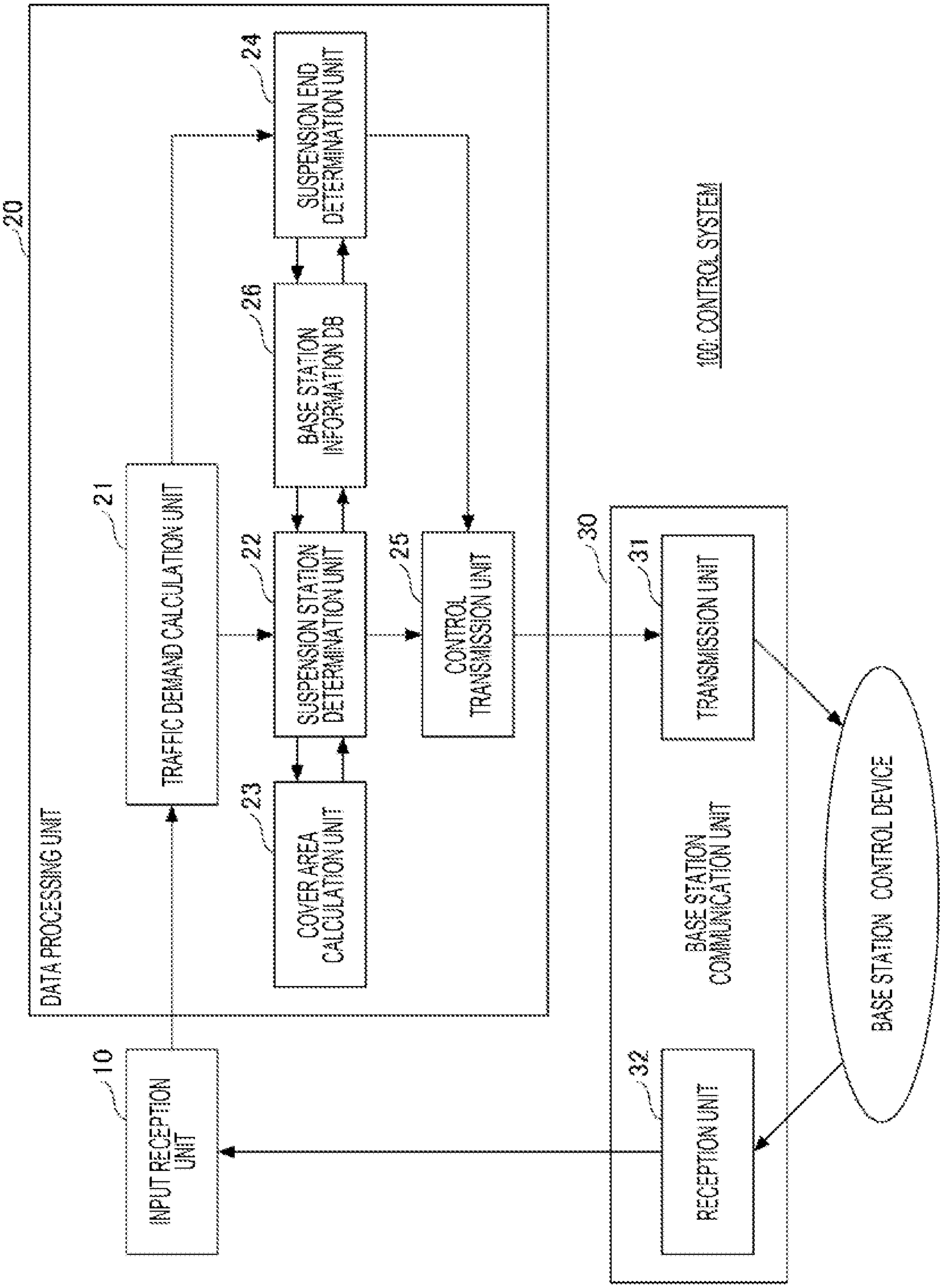
FIG. 1 is a configuration diagram of a control system according to an embodiment of the present invention.

FIG. 1 illustrates an example configuration of a control system 100 according to this embodiment. According to the control system 100 of this embodiment, base station information (position information (latitude/longitude), current parameters (tilt angle (°), transmission power (W), etc.), and a traffic demand (traffic amount (bps) for each area/time zone, the number of active users (persons) for each area/time zone) are input, and instruction information as to the suspension/operation of a base station, changed parameters (tilt angle, transmission power, etc.) of a base station, etc., are output.

As illustrated in FIG. 1, the control system 100 includes an input reception unit 10, a data processing unit 20, and a base station communication unit 30. The data processing unit 20 includes a traffic demand calculation unit 21, a suspension station determination unit 22, a cover area calculation unit 23, a suspension end determination unit 24, a control transmission unit 25, and a base station information DB 26. The base station communication unit 30 includes a transmission unit 31 and a reception unit 32.

Multiple base stations to be controlled and a control apparatus for controlling the base stations are connected to the base station communication unit 30. Each base station constitutes a communication area and performs wireless communication with a terminal in the area.

Note that the cover area calculation unit 23 may be included in the suspension station determination unit 22. Alternatively, the "suspension station determination unit 22+cover area calculation unit 23" may be referred to as a "suspension station determination unit". In addition, the control transmission unit 25 may include the function of the base station communication unit 30.

In addition, the control system 100 may include one apparatus (computer or the like) or may include multiple apparatuses. The control system 100 including one apparatus (computer or the like) may be referred to as a control apparatus. In addition, the data processing unit 20 may be referred to as a control apparatus.

In addition, the method of the mobile communication system according to this embodiment is not limited to a specific method. For example, the method may be any of 3G, 4G, 5G, 6G, and wireless LAN, and may be other methods.

An operation overview of each unit is as follows.

<Input Reception Unit 10>

The input reception unit 10 periodically observes the traffic demand of each base station. The observation cycle is set to, for example, about several minutes to several hours according to estimation/prediction accuracy required for the traffic demand calculation unit 21. The input reception unit 10 notifies the traffic demand calculation unit 21 of the observation result.

<Traffic Demand Calculation Unit 21>

The traffic demand calculation unit 21 calculates the current traffic demand and the future traffic demand of each base station based on the information from the input reception unit 10.

<Suspension Station Determination Unit 22>

The suspension station determination unit 22 determines a base station to be suspended (referred to as a suspension station) and a base station to change parameters (referred to as a repair station) based on the observation/prediction result by the traffic demand calculation unit 21 and the calculation result by the cover area calculation unit 23.

<Cover Area Calculation Unit 23>

The cover area calculation unit 23 calculates whether a coverage hole occurs because of the suspension of a base station, and when it occurs, whether the coverage hole can be covered by a peripheral base station.

<Suspension End Determination Unit 24>

The suspension end determination unit 24 determines whether to restart the operation of the suspension station based on the calculation result by the traffic demand calculation unit 21.

<Control Transmission Unit 25>

The control transmission unit 25 receives control contents from the suspension station determination unit 22 or the suspension end determination unit 24, and transmits the control contents to the base station communication unit 30. Based on the control contents, a target base station is controlled by the base station communication unit 30.

<Base Station Information DB 26>

The base station information DB 26 stores and manages the position information of each base station, parameters of each base station, suspension station information, and repair station information. These pieces of information are updated upon reception of the control contents determined by the suspension station determination unit 22 or the suspension end determination unit 24. In addition, the past information is also held in the base station information DB 26 according to the information used for calculation by the suspension station determination unit 22 and the suspension end determination unit 24.

Detailed Operation Example

Next, the operation of each unit in the data processing unit 20 will be described in more detail.

<Traffic Demand Calculation Unit 21>

The traffic demand calculation unit 21 calculates a current estimated value of the traffic demand of each base station and a future prediction value of each base station based on the information regarding the traffic demand periodically obtained from the input reception unit 10. The method of calculating the estimated value is not limited to a specific method, and, for example, an exponential smoothed moving average, a state space model, or the like can be used. The calculation method of the future prediction value of the traffic demand is not limited to a specific method, and, for example, a prediction method using SARIMA [5], a prediction method using LSTM [6], or the like can be used.

<Suspension Station Determination Unit 22>

Figure 2:
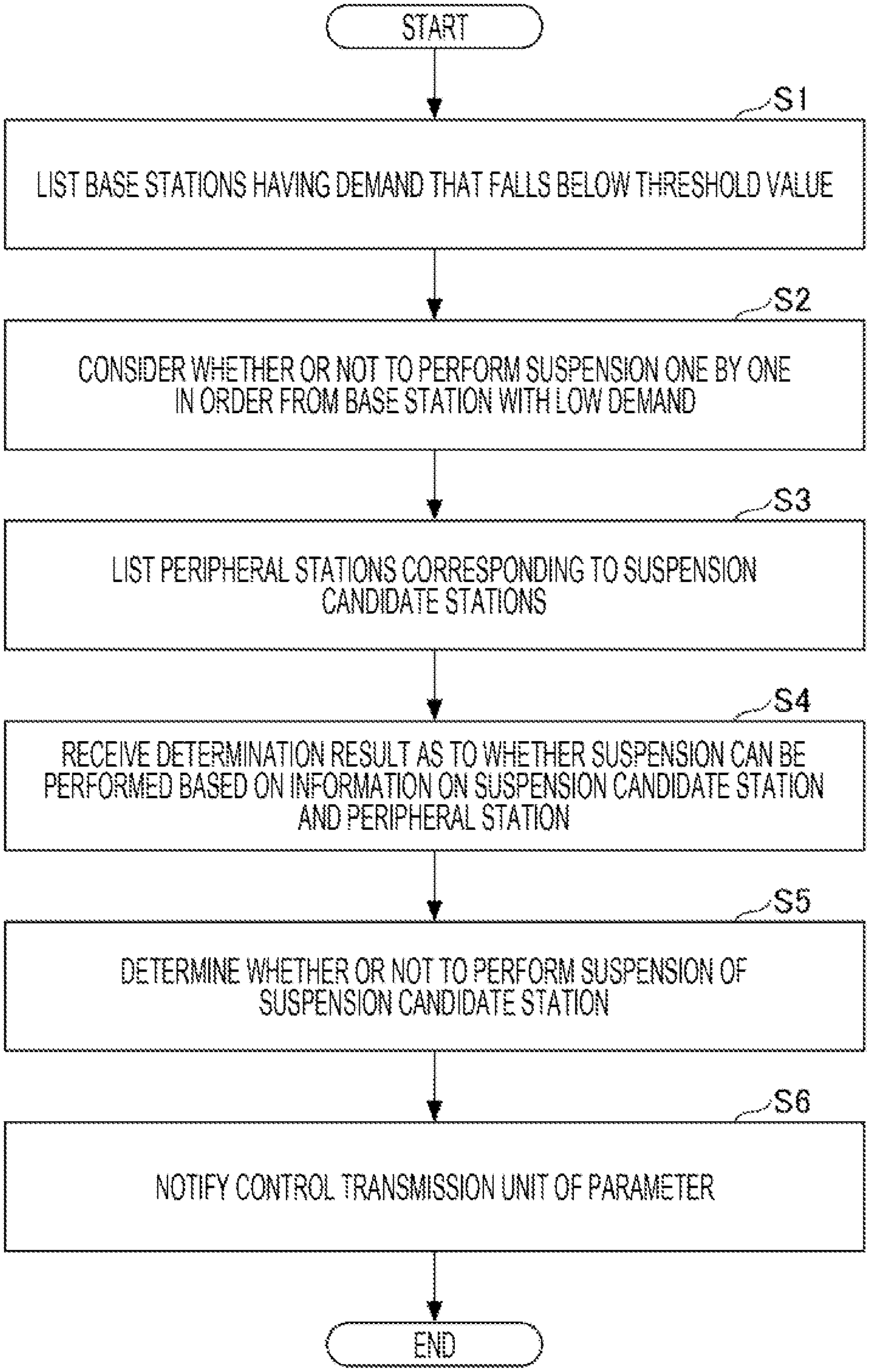
FIG. 2 is a flowchart for explaining an operation of a suspension station determination unit.

The suspension station determination unit 22 determines a base station to be suspended based on the calculation result by the traffic demand calculation unit 21 and the determination by the cover area calculation unit 23. The operation of the suspension station determination unit 22 will be described in detail, following the procedure of the flowchart of FIG. 2.

At S1, based on the traffic demand of each base station calculated by the traffic demand calculation unit 21, the suspension station determination unit 22 lists base stations having a demand that falls below a threshold value. If there is no base station with a low demand, the subsequent calculation is not performed, and information from the input reception unit 10 is awaited.

At S2, the suspension station determination unit 22 determines whether the base stations listed in S1 are to be subjected to a determination as to whether to perform suspension one by one in order from the base station with a lower demand. A base station that is a target for determining whether to perform suspension is referred to as a suspension candidate station.

Here, among the base stations with a low demand, a base station that has already been suspended and a base station (repair station or the like) that cannot be suspended are excluded from targets for determining whether to perform suspension, and other base stations are set as suspension candidate stations. Information on a base station that has already been suspended and a base station (repair station or the like) that cannot be suspended can be acquired from the base station information DB 26. In addition, the base station information DB 26 is updated according to the control contents determined by the suspension station determination unit 22.

At S3, the suspension station determination unit 22 lists, for a suspension candidate station, base stations (referred to as peripheral stations) that exist around the suspension candidate station and having a traffic demand that falls below a threshold value.

At S4, the suspension station determination unit 22 transmits information on the suspension candidate station and the peripheral stations to the cover area calculation unit 23, and receives a determination result as to whether suspension can be performed. The determination result includes a parameter indicating a frequency band to be suspended by the suspension candidate station and a parameter of the repair station.

At S5, the suspension station determination unit 22 determines whether to suspend the suspension candidate station based on the determination result received at S4. The processing of S3 to S5 is performed on each of the suspension candidate stations, and a base station to be suspended in any frequency band is determined.

At S6, the suspension station determination unit 22 notifies the control transmission unit 25 of parameters of a base station to be suspended (frequency band to be suspended, etc.) and parameters of a repair station at that time.

<Cover Area Calculation Unit 23>

Figure 3:
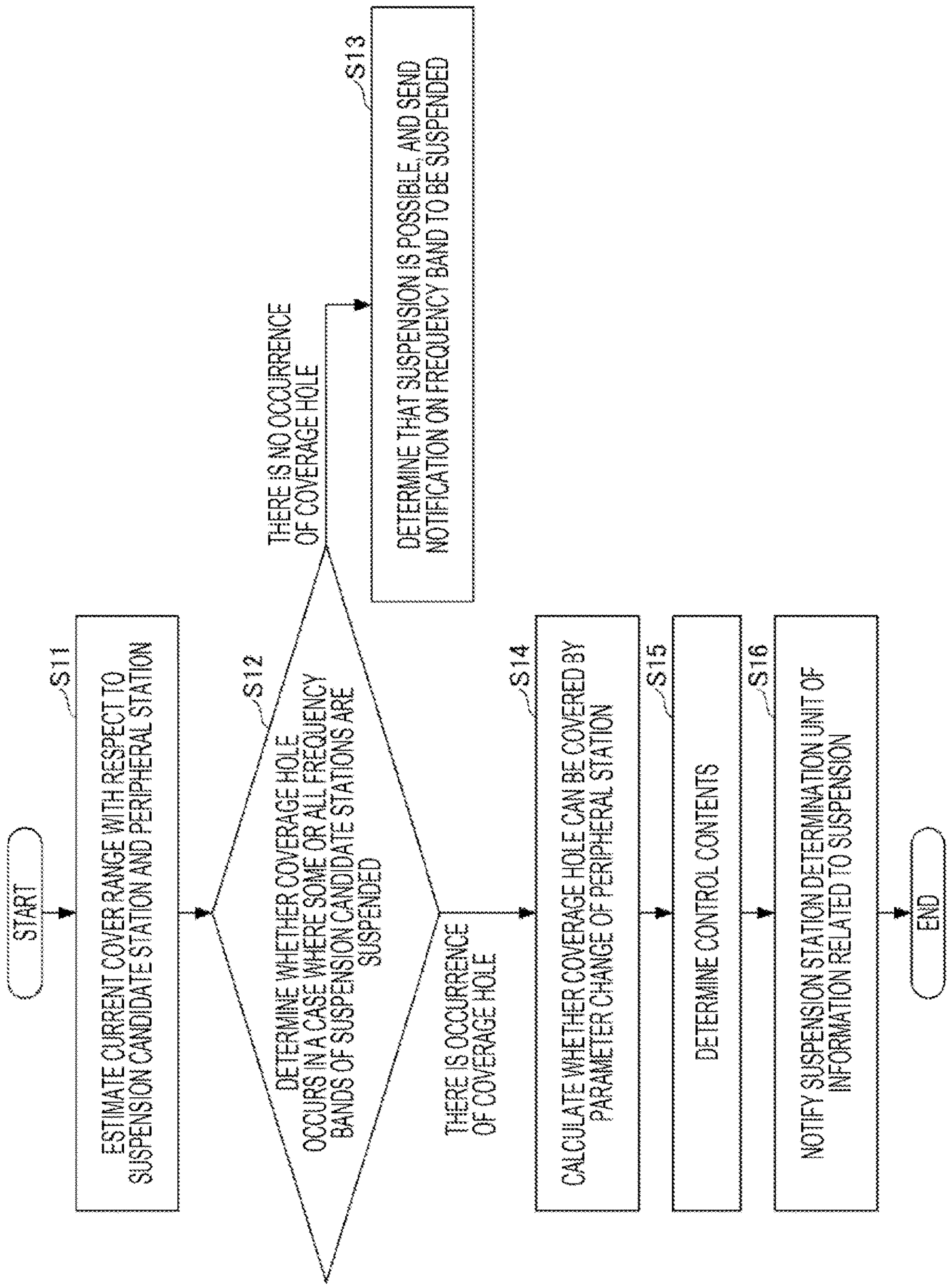
FIG. 3 is a flowchart for explaining an operation of a cover area calculation unit.

The cover area calculation unit 23 calculates whether a coverage hole occurs because of the suspension of a suspension candidate station, and whether the coverage hole can be covered by a peripheral station (when it occurs). The operation of the cover area calculation unit 23 will be described in detail, following the procedure of the flowchart of FIG. 3. When there are multiple sets of "suspension candidate station and one or more peripheral stations corresponding to the suspension candidate station", the following processing is executed for each set.

At S11, the cover area calculation unit 23 estimates a current cover range with respect to the suspension candidate station and the peripheral station that have been sent from the suspension station determination unit 22. There are multiple methods for estimating the cover range, and any method may be used.

For example, as a method of estimating the cover range, the geometric cover range estimation method of the literature [3], the highly accurate estimation in consideration of the propagation loss and the radio wave interference of the literature [4], or the like can be used. These can be changed according to the requirements of calculation time and estimation accuracy, and when a sufficient calculation time can be secured, the cover range is estimated based on the technique of the literature [4], and otherwise, the cover range is estimated based on the technique of the literature [3].

The cover range of the base station is, for example, a range in which a terminal present is enabled to perform communications with the base station with a predetermined communication quality.

The cover range may not only be defined in view of communication quality but also be defined as "a range that can cover communication in view of traffic accommodation."

At S12, the cover area calculation unit 23 uses the cover range obtained in S11 to determine whether a coverage hole is generated by suspending one or more or all frequency bands of the suspension candidate station. The coverage hole is a range that is covered by neither the coverage range of the suspension candidate station nor the coverage range of the peripheral station.

Specifically, the cover area calculation unit 23 causes the frequency bands of the suspension candidate station to be suspended one by one, and determines whether a coverage hole occurs in each situation. As the order of suspending the frequency bands, for example, there is a method of performing suspension in order from a higher frequency band.

If it is determined at S12 that no coverage hole is to be generated even when all the frequency bands are suspended, the process proceeds to S13, where it is determined that all the frequency bands of this suspension candidate station can be suspended and the suspension station determination unit 22 is notified of a frequency band to be suspended of this suspension candidate station. The suspension station determined here is a suspension station that does not require a change in parameters of the peripheral station.

If it is determined at S12 that a coverage hole is to be generated by suspending any frequency band, the process proceeds to S14, and whether the coverage hole can be covered by a change in parameters of the peripheral station is calculated for each situation of the suspension of the frequency band.

The cover area calculation unit 23 calculates the coverage ratio of the coverage hole by the coverage range of the peripheral station, using, for example, the technique of the literature [3]. Specifically, when the calculated coverage ratio with respect to the coverage hole is equal to or greater than a threshold value, it is determined that the coverage hole can be covered. The peripheral station that changes a parameter for the cover is referred to as a repair station. Parameters to be changed may be, but are not limited to, the tilt angle and transmission power of an antenna, etc. In addition, there may be one repair station or multiple repair stations for a certain suspension station.

At S15, the cover area calculation unit 23 adopts, as the control contents, a situation in which the number of frequency bands that can be suspended is the largest among situations with respect to which it is determined that covering is possible with the repair station. If it is determined that covering is possible in none of the situations, no suspension is performed.

At S16, the cover area calculation unit 23 notifies the suspension station determination unit 22 whether it is possible to suspend a base station, of a frequency band to be suspended of a suspension candidate station (if the suspension can be performed), and of the parameter of the repair station.

<Suspension End Determination Unit 24>

Figure 4:
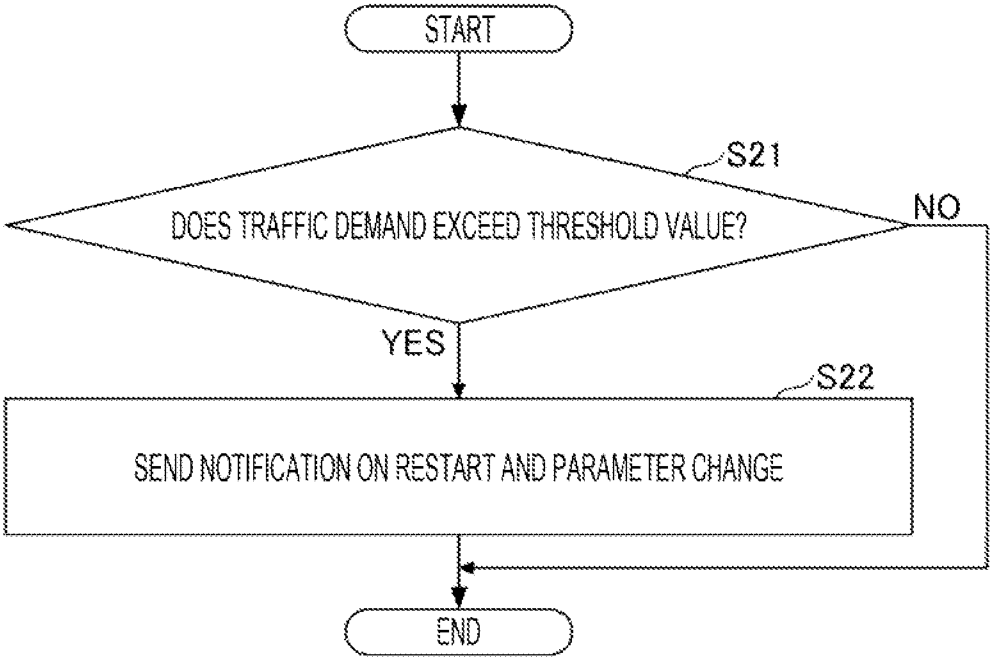
FIG. 4 is a flowchart for explaining an operation of a suspension end determination unit.

The suspension end determination unit 24 determines whether to restart the operation of the suspension station that is suspended in at least one frequency band based on the calculation result by the traffic demand calculation unit 21. The operation of the suspension end determination unit 24 is described, following the procedure of the flowchart of FIG. 4.

At S21, the suspension end determination unit 24 determines whether the traffic demand of the suspension station or the repair station exceeds a threshold value. The information on the traffic demand of the current suspension station and its repair station can be acquired from the base station information DB 26.

If it is determined that the traffic demand of the suspension station or the repair station exceeds the threshold value, the process proceeds to S22, and the suspension end determination unit 24 notifies the control transmission unit 25 of the restart of the suspension station (the restart of the suspended frequency band) and the change of the parameters of the repair station.

For the parameter change, for example, processing such as returning the parameter to the parameter before covering the coverage hole. In addition, the suspension end determination unit 24 updates the base station information DB 26 according to the control result determined as described above. By this update, for example, the base station managed in the base station information DB 26 as a suspension station is managed as a normal base station that is not a suspension station.

If it is determined that the traffic demand of the suspension station or the repair station does not exceed the threshold value at S21, the situation is the same as the situation when the suspension control is performed, and thus, nothing is performed and the suspension is continued.

<Control Transmission Unit 25>

The control transmission unit 25 receives the control contents determined by the suspension station determination unit 22 and the suspension end determination unit 24, and transmits the control contents to the base station communication unit 30. More specifically, the control transmission unit 25 starts transmission immediately after receiving a notification from the suspension station determination unit 22 or the suspension end determination unit 24. Note that if notifications are simultaneously received from the suspension station determination unit 22 and the suspension end determination unit 24, these pieces of information are transmitted together.

Note that, as in Example 2 to be described below, if the control transmission unit 25 receives the control contents for each time zone, the control transmission unit 25 receives the control contents until the current time reaches the time zone, and transmits the corresponding control contents when the current time reaches the time zone.

Hereinafter, Examples 1 to 3 are described as examples of the base station control.

Example 1: Base Station Control Based on Current Traffic Demand

Figure 5:
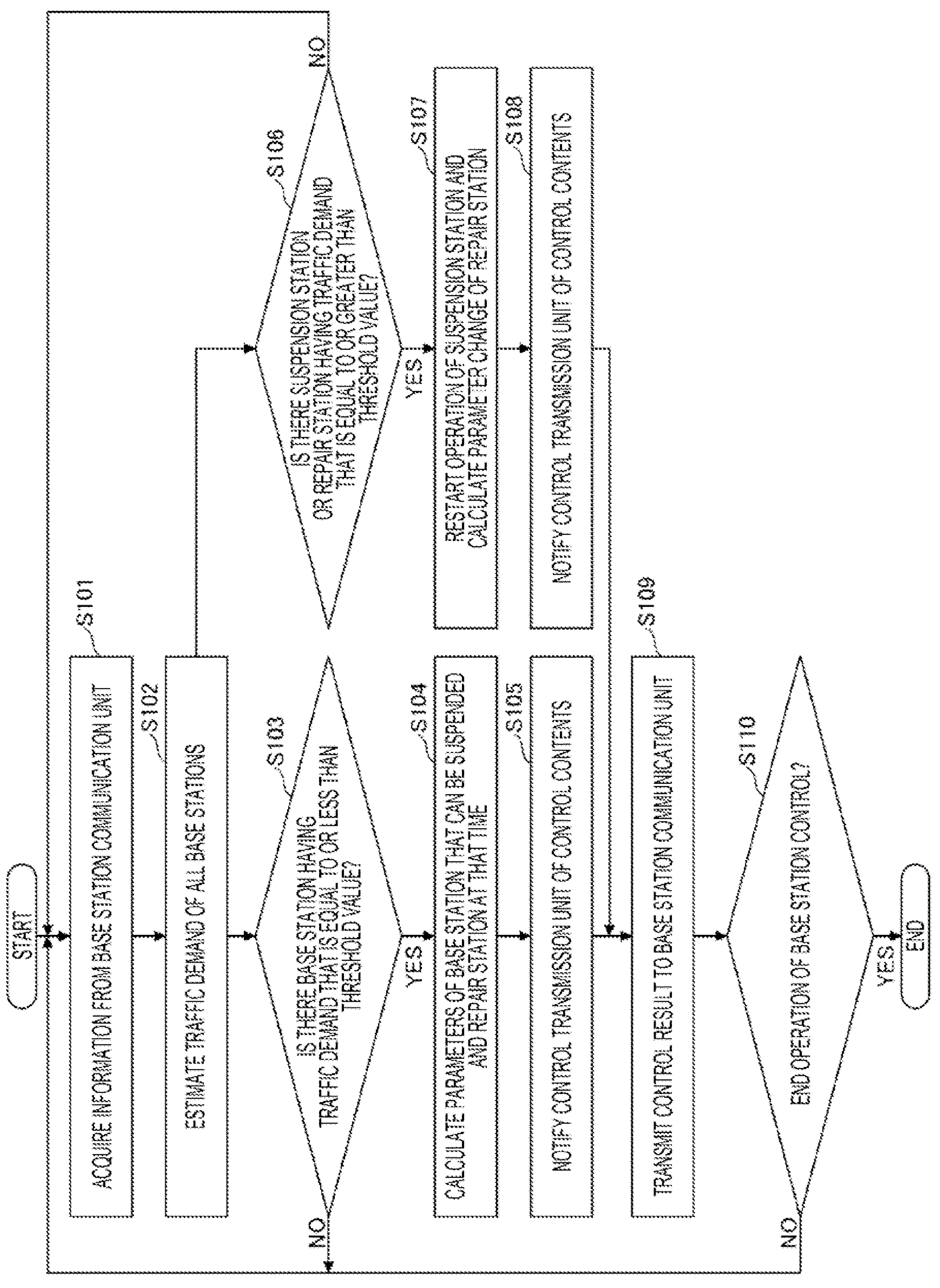
FIG. 5 is a flowchart for explaining an operation of an example.

In Example 1, the suspension contents of the base station and the parameter change of the repair station are calculated according to the traffic demand periodically observed, and the corresponding base station is controlled based on the calculation result. The processing of Example 1 is described with reference to the flowchart of FIG. 5. In this example, the control cycle is set to, for example, about several minutes to one hour, and online control is periodically performed. That is, the processing of the flowchart of FIG. 5 is periodically executed.

At S101, the input reception unit 10 periodically acquires information from the base station communication unit 30. At S102, the traffic demand calculation unit 21 estimates a current traffic demand from the information acquired at S101.

At S103, the suspension station determination unit 22 determines whether there is a base station having a traffic demand that is equal to or less than a threshold value based on the estimation result at S102, and if there is one, the process proceeds to S104. If there is no base station having a traffic demand that is equal to or less than the threshold value, subsequent operations are not performed, and the process returns to S101 to wait for information from the input reception unit 10.

At S104, the suspension station determination unit 22 calculates parameters of the base station that can be suspended and a repair station in that case based on the estimation result at S102. At S105, the suspension station determination unit 22 notifies the control transmission unit 25 of the calculation result.

At S106, based on the estimation result at S102, the suspension end determination unit 24 determines whether there is a suspension station or a repair station having a traffic demand that is equal to or greater than the threshold value, that is, whether to restart the base station that has already been suspended. In the case of restarting, the process proceeds to S107. If there is no suspension station or repair station having a traffic demand that is equal to or greater than the threshold value, the subsequent operation is not performed, and the process returns to the beginning.

At S107, the suspension end determination unit 24 determines the restart of the operation of the corresponding suspension station and calculates the parameter after the change of the repair station, and at S108, notifies the control transmission unit 25 of the control contents (calculation result).

At S109, the control transmission unit 25 transmits control information indicating the suspension/restart/parameter change of the base station to the base station communication unit 30.

At S110, it is determined whether to end the operation of the base station control. In the case of ending the operation, the operation of this system ends. In the case of not ending the operation, the processing described above is repeated.

Example 2: Base Station Control Based on Traffic Demand Prediction

In Example 2, in the data processing unit 20, the control pattern of the suspension and the tilt angle change of the base station is prepared for each time zone in advance using a future prediction value of traffic demand. Then, the base station communication unit 30 is instructed to perform control in each time zone. In Example 2, the control cycle is, for example, about several hours, and offline control is performed every cycle.

In Example 2, unlike Example 1, the calculation time of the base station parameters in the cover area calculation unit 23 can be sufficiently secured, and highly accurate control in consideration of radio wave interference or the like can be performed. The flow of processing executed by the data processing unit 20 in Example 2 is as follows.

First, the traffic demand calculation unit 21 calculates a prediction value of traffic demand for each time zone of each base station based on information regarding traffic demand that is periodically observed. The prediction value is stored in the base station information DB 26.

Next, the suspension station determination unit 22 and the suspension end determination unit 24 calculate the suspension/restart/parameter change of the base station for each time zone from the prediction value of the demand in each time zone stored in the base station information DB 26, and collectively notify the control transmission unit 25 of the control contents. The control transmission unit 25 holds the sent control contents.

The control transmission unit 25 transmits the control contents received in advance to the base station communication unit 30 according to a time zone, and gives an instruction for control.

Example 3: Base Station Control Combined with Examples 1 and 2

In Example 3, offline control based on traffic demand prediction is performed similarly to the Example 2, and if sudden traffic demand fluctuation or base station failure occurs, online control similar to that of Example 1 is performed. As a result, it is possible to achieve both highly accurate control in consideration of radio wave interference or the like in normal times and coping with sudden demand fluctuations. The flow of processing executed by the data processing unit 20 in Example 3 is as follows.

The input reception unit 10 acquires the observation information in a cycle shorter than about several hours, for example, a cycle of several minutes, which is the control cycle of Example 2. The traffic demand calculation unit 21 estimates the current traffic demand of each base station based on the observation information.

If there is a base station having a current traffic demand that exceeds a threshold value, new control contents are calculated by the same processing as in Example 1 and are sent to the control transmission unit 25, and the control transmission unit 25 transmits the control contents to the base station communication unit 30.

If there is no base station having a current traffic demand that exceeds the threshold value, the control contents for each time zone are determined based on a future traffic demand by the same processing as in Example 2, the control contents are transmitted to the base station communication unit 30 for each time zone, and an instruction for control is given.

(Hardware Configuration Example)

The control system 100 or the control apparatus can be implemented by, for example, causing a computer to execute a program. This computer may be a physical computer, or may be a virtual machine on a cloud. Hereinafter, the control system 100 and the control apparatus are collectively referred to as "apparatus".

Specifically, the apparatus can be implemented by executing a program corresponding to the processing to be performed in the apparatus, using hardware resources such as a CPU and a memory built into the computer. The above program can be stored and distributed by being recorded in a computer-readable recording medium (portable memory or the like). The above program can also be provided through a network such as the Internet or an electronic mail.

Figure 6:
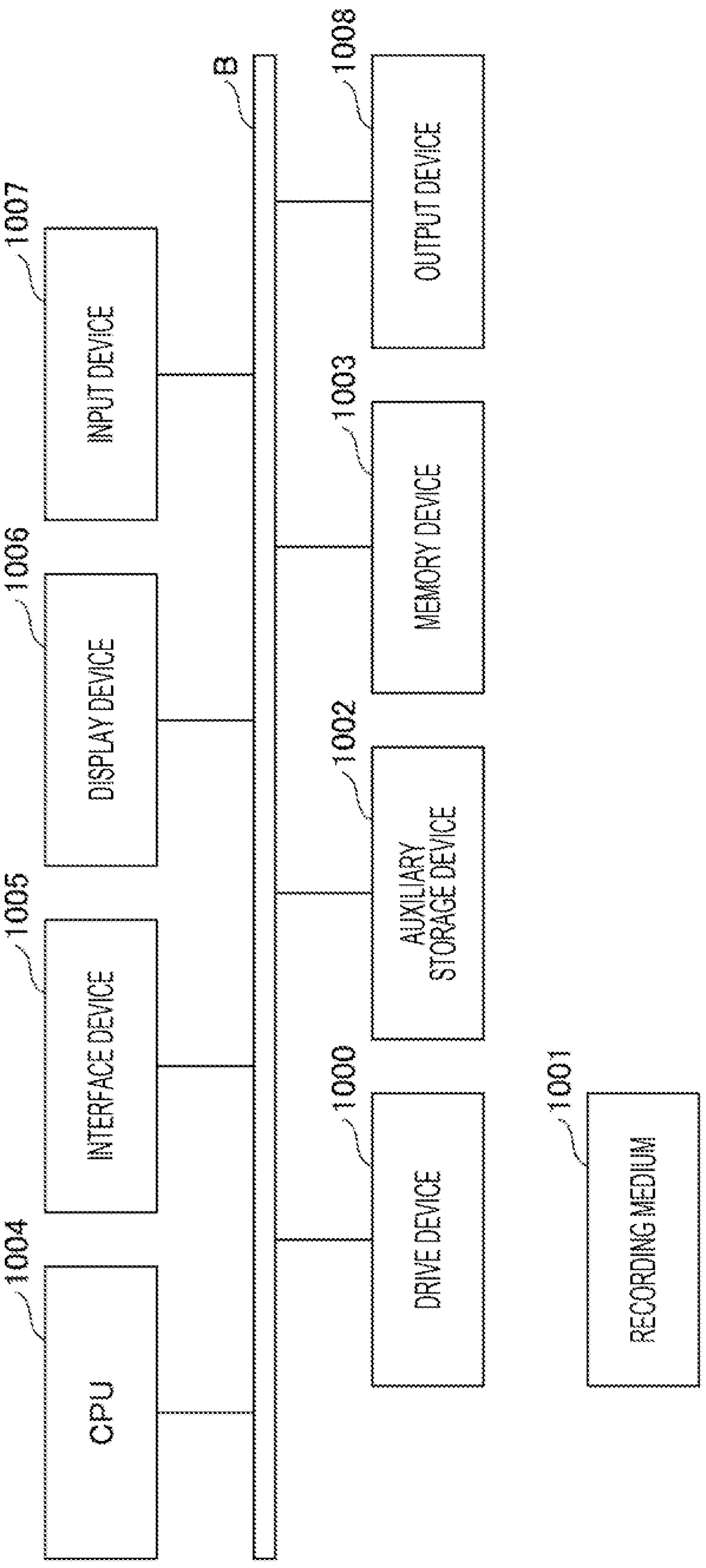
FIG. 6 is a diagram illustrating a hardware configuration example of an apparatus.

FIG. 6 is a diagram illustrating an example hardware configuration of the computer. The computer in FIG. 6 includes a drive device 1000, an auxiliary storage device 1002, a memory device 1003, a CPU 1004, an interface device 1005, a display device 1006, an input device 1007, and an output device 1008, which are connected to one another by a bus BS.

A program for implementing processing in the computer is provided through a recording medium 1001 such as a CD-ROM or a memory card, for example. When the recording medium 1001 storing the program is set in the drive device 1000, the program is installed on the auxiliary storage device 1002 from the recording medium 1001 via the drive device 1000. Here, the program is not necessarily installed from the recording medium 1001, and may be downloaded from another computer via a network. The auxiliary storage device 1002 stores the installed program, and also stores necessary files, data, and the like.

When an instruction to start the program is made, the memory device 1003 reads the program from the auxiliary storage device 1002 and stores the program. The CPU 1004 implements a function related to the device in accordance with a program stored in the memory device 1003. The interface device 1005 is used as an interface for connection to a network or the like. The display device 1006 displays a graphical user interface (GUI) or the like by the program. The input device 1007 is constituted by a keyboard and a mouse, buttons, a touchscreen, or the like, and is used to input various operation instructions. The output device 1008 outputs a calculation result.

Effects of Embodiment

With the technique according to this embodiment, it is possible to achieve both the suppression of deterioration in communication quality and reduction in the power consumption of a base station in a mobile communication system. As secondary effects, there are following effects 1 to 3.

Effect 1: In the control, the number of terminals in which the communication quality deteriorates because of the suspension of the base station can be reduced as compared with the prior art by placing the securing of the communication quality of the terminal as a constraint.

Effect 2: By simultaneously optimizing parameter settings of a base station to be suspended and a base station to be operated, more base stations can be suspended and power consumption can be further reduced as compared with the prior art.

Effect 3: By optimizing the base station to be suspended simultaneously with parameter setting of other base stations, even in an area where the cells of base stations do not overlap or an area where the density of base stations is low, to which the prior art cannot be applied, some base stations can be suspended, and power consumption can be reduced.

Supplementary Notes

In the present specification, at least a control apparatus, a control method, and a program in the following items are disclosed.

Item 1

A control apparatus that controls a base station in a mobile communication system including multiple base stations, the control apparatus including:
- a suspension station determination unit configured to determine, based on a traffic demand of each of the base stations, a suspension station that suspends at least one frequency band and a parameter of at least one repair station that covers a coverage hole generated by the suspension of the suspension station; and
- a control transmission unit configured to transmit control information, the control information including information on the suspension station determined by the suspension station determination unit and the parameter.

Item 2

The control apparatus according to item 1, in which
- the suspension station determination unit determines a parameter of the at least one repair station corresponding to a situation in which a number of frequency bands suspendable by the suspension station is the largest among situations in which the at least one repair station is able to cover a coverage hole.

Item 3

The control apparatus according to item 1 or 2, in which
- the suspension station determination unit determines a base station in which no coverage hole is generated even when all frequency bands are suspended as a suspension station that does not require a parameter change of a peripheral station.

Item 4

The control apparatus according to any one of items 1 to 3, further including:
- a suspension end determination unit configured to determine whether to restart a suspended frequency band in a suspension station based on traffic demand.

Item 5

The control apparatus according to any one of items 1 to 4, in which
- the suspension station determination unit determines control information for each future time zone based on a prediction value of a future traffic demand, and the control transmission unit transmits the control information when a time of the time zone arrives.

Item 6

A control method executed by a control apparatus that controls a base station in a mobile communication system including multiple base stations, the control method including:
- a suspension station determination step that determines, based on a traffic demand of each of the base stations, a suspension station that suspends at least one frequency band and a parameter of at least one repair station that covers a coverage hole generated by the suspension of the suspension station; and
- a control transmission step that transmits control information, the control information including information on the suspension station determined by the suspension station determination step and the parameter.

Item 7

A program for causing a computer to function as each unit in the control apparatus according to any one of items 1 to 5.

Although the embodiment is described above, the present invention is not limited to the specific embodiment, and various modifications and changes can be made within the scope of the gist of the present invention described in the claims.

REFERENCE LITERATURES

[1] E. Oh and B. Krishnamachari, "Energy Savings through Dynamic Base Station Switching in Cellular Wireless Access Networks," 2010 IEEE Global Telecommunications Conference GLOBECOM 2010, 2010, pp. 1-5, doi: 10.1109/GLOCOM.2010.5683654.
[2] Y. Gao, Y. Li, H. Yu, X. Wang and S. Gao, "Energy efficient joint optimization of electric antenna tilt and transmit power in 3GPP LTE-Advanced: A system level result," 2013 IEEE 9th International Colloquium on Signal Processing and its Applications, 2013, pp. 135-139, doi: 10.1109/CSPA.2013.6530029.
[3] Masayoshi Iwamoto, Akito Suzuki, Shigeaki Harada, "Antenna tilting angle control method for early recovery of communication interruption area," The IEICE Society Conference, B-7-6, September 2020.
[4] N. Dandanov, H. Al-Shatri, A. Klein, and V. Poulkov, "Dynamic Self-Optimization of the Antenna Tilt for Best Trade-off Between Coverage and Capacity in Mobile Networks," Wirel. Pers. Commun., vol. 92, no. 1, pp. 251-278, 2017.
[5] Luo, X., Niu, L. & Zhang, S. An Algorithm for Traffic Flow Prediction Based on Improved SARIMA and GA. KSCE J Civ Eng 22, 2018, pp. 4107-4115.
[6] H. D. Trinh, L. Giupponi and P. Dini, "Mobile Traffic Prediction from Raw Data Using LSTM Networks," 2018 IEEE 29th Annual International Symposium on Personal, Indoor and Mobile Radio Communications (PIMRC), 2018, pp. 1827-1832, doi: 10.1109/PIMRC.2018.8581000.

REFERENCE SIGNS LIST

100 Control system
10 Input reception unit
20 Data processing unit
21 Traffic demand calculation unit
22 Suspension station determination unit
23 Cover area calculation unit
24 Suspension end determination unit
25 Control transmission unit
26 Base station information DB
30 Base station communication unit
31 Transmission unit
32 Reception unit
1000 Drive device
1001 Recording medium
1002 Auxiliary storage device
1003 Memory device
1004 CPU

1005 Interface device
1006 Display device
1007 Input device
1008 Output device

The invention claimed is:

1. A control apparatus that controls a base station in a mobile communication system including a plurality of base stations, the control apparatus comprising:

processing circuitry configured to determine, based on a traffic demand of each of the base stations, a suspension station that suspends at least one frequency band and a parameter of at least one repair station, wherein the at least one repair station is configured such that a coverage range of the at least one repair station is changed to cover a coverage hole generated by the suspension of the suspension station based on the parameter; and transmit control information, the control information including information on the determined suspension station and the parameter.

2. The control apparatus according to claim 1, wherein the processing circuitry is further configured to determine a parameter of the at least one repair station corresponding to a situation in which a number of frequency bands suspendable by the suspension station is the largest among situations in which the at least one repair station is able to cover the coverage hole.

3. The control apparatus according to claim 1, wherein the processing circuitry is further configured to determine, as the suspension station that does not require a parameter change of a peripheral station, a base station in which no coverage hole is generated even when all frequency bands are suspended.

4. The control apparatus according to claim 1, wherein the processing circuitry is further configured to determine whether to restart the suspended at least one frequency band in the suspension station based on the traffic demand.

5. The control apparatus according to claim 1, wherein the processing circuitry is further configured to determine the control information for each of a plurality of future time periods based on predicted traffic demand for each of a plurality of future time periods, and transmit the control information corresponding to a target future time period among the plurality of future time periods upon an arrival of the target future time period.

6. A control method executed by a control apparatus that controls a base station in a mobile communication system including a plurality of base stations, the control method comprising:

determining, based on a traffic demand of each of the base stations, a suspension station that suspends at least one frequency band and a parameter of at least one repair station, wherein the at least one repair station is configured such that a coverage range of the at least one repair station is changed to cover a coverage hole generated by the suspension of the suspension station based on the parameter; and transmitting control information, the control information including information on the determined suspension station and the parameter.

7. A non-transitory computer-readable recording medium storing a program for causing a computer to execute a process, the process including:

determining, based on a traffic demand of each of the base stations, a suspension station that suspends at least one frequency band and a parameter of at least one repair station, wherein the at least one repair station is configured such that a coverage range of the at least one repair station is changed to cover a coverage hole generated by the suspension of the suspension station based on the parameter; and transmitting control information, the control information including information on the determined suspension station and the parameter.

* * * * *